United States Patent [19]
Kuo et al.

[11] Patent Number: 5,545,823
[45] Date of Patent: *Aug. 13, 1996

[54] SELF-POLISHING TYPE ANTIFOULING COATING COMPOSITION CONTAINING FILM-FORMABLE METAL SOAP COMPOUND

[75] Inventors: Ping-Lin Kuo, Kaohsiung; Theng-Fu Chuang, Feng-Shan, both of Taiwan

[73] Assignee: Yung Chi Paint & Varnish Mfg. Co., Ltd., Kaohsiung, Taiwan

[*] Notice: The term of this patent shall not extend beyond the expiration date of Pat. No. 5,382,281.

[21] Appl. No.: 311,603

[22] Filed: Sep. 23, 1994

Related U.S. Application Data

[63] Continuation-in-part of Ser. No. 112,427, Aug. 26, 1993, Pat. No. 5,382,281, which is a continuation of Ser. No. 713,759, Jun. 11, 1991, abandoned.

[51] Int. Cl.⁶ .............................. C08L 43/04; C09D 5/14
[52] U.S. Cl. .................... 523/122; 523/177; 424/78.09; 106/15.05; 524/261; 524/264; 524/265
[58] Field of Search ........................... 523/122, 177; 424/78.09; 106/15.05; 524/261, 264, 265

[56] References Cited

U.S. PATENT DOCUMENTS

| | | | |
|---|---|---|---|
| 2,411,938 | 5/1941 | Ratner | 524/315 |
| 2,423,044 | 6/1947 | Nowak | 556/125 |
| 3,308,078 | 3/1967 | Rogers | 524/272 |
| 3,817,761 | 6/1974 | Brake | 106/18.32 |
| 3,898,190 | 8/1975 | Willey | 523/177 |
| 4,654,380 | 3/1987 | Makepeace | 523/122 |
| 4,774,080 | 9/1988 | Yamamori | 424/78.09 |
| 4,904,504 | 2/1990 | Isozaki et al. | 427/387 |
| 5,332,431 | 7/1994 | Yokoi et al. | 106/15.05 |
| 5,348,576 | 9/1994 | Yokoi et al. | 106/15.05 |

FOREIGN PATENT DOCUMENTS 0204456  12/1986  European Pat. Off. .

OTHER PUBLICATIONS

Hawley's Condensed Chemical Dictionary, 11th edition (revised by Sax & Lewis, Jr.), 1987, p. 1049.

*Primary Examiner*—Paul R. Michl
*Assistant Examiner*—John J. Guarriello
*Attorney, Agent, or Firm*—Merchant, Gould, Smith, Edell, Welter, Schmidt

[57] ABSTRACT

An antifouling coating composition includes a binder copolymer which contains one or more copolymerizable ethylenically unsaturated monomers or oligomers wherein at least one of said monomers or oligomers has a hydroxy group, a copolymerizable silicone monomer or oligomer, and a film formable metal soap compound which is prepared by reacting a metal compound containing a metal having a valency of at least 2 with an unsaturated fatty acid or alcohol.

10 Claims, No Drawings

SELF-POLISHING TYPE ANTIFOULING COATING COMPOSITION CONTAINING FILM-FORMABLE METAL SOAP COMPOUND

This application is a Continuation-In-Part application of U.S. patent application Ser. No. 08/112,427 filed on Aug. 26, 1993, and issued as U.S. Pat. No. 5,382,281, which is a continuation of U.S. patent application Ser. No. 07/713,759 filed on Jun. 11, 1991, and since abandoned.

FIELD OF THE INVENTION

The present invention relates to an antifouling coating composition, and particularly to a self-polishing type antifouling coating comprising a hydrolyzable resinous binder composition which contains a film-formable metal soap compound.

BACKGROUND OF THE RELATED PRIOR ART

Antifouling paints are well known for use in coating the surface of the submarine parts of a ship's hull in order to protect them from fouling resulting from the growth of marine organisms on the surface. Typically, an antifouling paint contains an antifouling agent which can be freed from the surface of the paint to the marine organisms accumulated on the hull surface by concentration gradient. Self-polishing type antifouling paints are gradually dissolvable in seawater to continuously reveal, over a period, a fresh anti-fouling paint surface which permits release of the antifouling agent. Such self-polishing type antifouling paints contain a film-forming resin which is hydrolyzable by seawater.

Metal soaps prepared by reacting high hydrophobic saturated fatty acids such as naphthenic acid with a compound of a multi-valent metal such as Co, Mn, Zn, Cu or Ca are commercial products well known as driers and catalysts for paints. The metal soaps produced from such saturated fatty acids do not function as a film-forming binder.

U.S. Pat. No. 2,423,044 discloses a hydrolyzable resin composition which comprises an acrylic resin having at least one side chain bearing at least one metal ester containing terminal group. The patent suggests use of monovalent organic acids to react with a metal compound for the formation of the metal ester containing terminal group. The monovalent organic acids as disclosed are saturated organic acids including saturated fatty acids.

The basic U.S. application of this application discloses a self-polishing type antifouling coating composition which comprises a metallic soap compound prepared by reacting a metal compound containing a metal having a valency of at least 2 with at least an unsaturated fatty acid or alcohol. The metallic soap compound formed thereby is used as a film-forming binder for the coating position.

SUMMARY OF THE INVENTION

An object of the invention is to provide a self-polishing antifouling coating composition comprising a film formable metal-soap resin modified by a silicone resin which is of low surface tension thereby reducing accumulation of microorganisms on the surface of a ship hull.

According to the invention, a self-polishing type antifouling coating composition containing a copolymer formed of a film-forming binder composition comprises:

one or more copolymerizable ethylenically unsaturated monomers or oligomers wherein at least one of said monomers or oligomers has a hydroxy group;

a copolymerizable silicone monomer or oligomer; and a film formable metal soap compound which is prepared by reacting a metal compound containing a metal having a valency of at least 2 with an unsaturated fatty acid or alcohol:

wherein said copolymer contains a group having a general formula

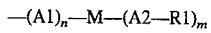

wherein R1 is a alkenyl group derived from an unsaturated fatty acid or alcohol, M is a metal having a valency of at least 2, A1 and A2 are independently a functional group of a carboxylic acid, a sulfonic acid or a phosphoric acid, and each of n and m=1 or 2, and n+m =2 or 3.

According to one aspect of the invention, the hydrolyzable antifouling coating composition further comprises an effective amount of an antifouling agent which is a metallic compound other than said metal soap compound.

The film formable metal soap compound used in the present invention may be prepared by reacting a metal compound with an unsaturated fatty acid, a mixture of unsaturated fatty acid or a mixture containing at least one unsaturated fatty acid.

The unsaturated fatty acids useful for the invention comprises oleic acid, linoleic acid, linolenic acid, eleostearic acid, lincanic acid, ricinoleic acid, erucic acid and may be obtained from castor oil, soybean oil, corn oil, cotton seed oil, linseed oil, oiticica oil, perilla oil, poppyseed oil, rapeseed soil, safflower oil, sunflower oil, tall oil, tung oil, walnut oil, herring oil, menhaden oil and sardine oil. The above unsaturated acids may be converted into a fatty alcohol which can be used to prepare a phosphoric or sulfonic acid obtaining an unsaturated aliphatic group.

The metal compound may be an oxide, a hydroxide or a chloride. Most of the metals in the Periodic table with a valency of at least 2 can be used in the present invention. They may be the metals belonging to Group Ib, IIa, IIb, IIIa, IIIb, IVa, IVb, Va, Vb, VIIa and VIII. The type of metal contained in the metal compound has a considerable influence on the rate of hydrolysis of the metallic soap binder. Soaps of alkali metals are readily soluble in water whereas soaps prepared from alkaline earth metals are water insoluble but hydrolyzable in water. Different alkaline earth metals may result in different hydrolysis rates. For example, an alkaline earth metal with higher molecular weight such as barium shows a slower hydrolysis rate that other alkaline earth metal having lower molecular weight such as magnesium. The rate of hydrolysis also varies when using metals of Group III, IV and transition metals such as Al, Co, Zn, Mn, Co, etc.

The ethylenically unsaturated monomers or oligomers suitable for the present invention comprises acrylic monomers and unsaturated organic acids containing —COO, —OSO₂—, or —O—PO₃, Examples of such unsaturated organic acids and monomers are methacrylic acid, acrylic acid, p-styrene sulfonic acid, 2-methyl-2-acrylamide propane sulfonic acid, methacryl acid phosphoxy propyl, methacryl acid phosphoxy ethyl, itaconic acid and maleic acid. Hydroxyl containing monomers may be hydroxyl containing acrylic monomers such as hydroxyethylmethacrylate, hydroxymethylmethacrylate, hydroxyethylacrylate, and hydroxymethylacrylate.

Other monomers copolymerizable with the above ethylenically unsaturated monomers or oligomers are vinyl acetate, vinyl propionate, monoakyl itaconate, monoakyl maleate, methyl acrylate, ethyl acrylate, propyl acrylate, butyl acrylate, amyl acrylate, hexyl acrylate, methyl methacrylate, acid anhydrides such as maleic anhydride and itaconic anhydride, vinyl monomers containing an amide group such as acrylamide and vinyl monomers containing an amino group.

The copolymerizable silicone monomer may be any of silicon compounds having one or more hydroxy or alkoxy groups directly bonded to a silicon atom. Some examples of such silicon compounds are trimethylmethoxysilane, tri(1-methylethyl)ethoxysilane, di(1-methylpropyl)diethoxysilane, and ethyltriethoxysilane. The silicone oligomers may be siloxane oligomers containing one or more hydroxy or alkoxy groups such as methoxy or ethoxy functional groups. Examples of such oligomers are methoxy-functional, low molecular weight silicone resins which are manufactured by Dow Corning Corporation under the brand names of Dow Corning Q1-3074 and Dow Corning 3037 and by the Wacker Company under the brand name of Wacker Silicone Intermediate SY-231.

Other polymers may be blended with the copolymer prepared according to the present invention. Preferably, such polymers are water soluble. Examples of them are rosin, polyacrylamide and other polymers containing hydrophilic groups such as polyesters and polyurethanes containing a carboxylic acid group, a sulfonic acid group, a phosphoric acid group, an amino group or an amide group.

The present invention will be now more fully explained in the following examples.

EXAMPLE 1

A solution containing 20 parts of hydroxyethylmethacrylate, 80 parts of butylacrylate, 30 parts of acrylic acid and 70 parts of methyl methacrylate and a solution containing 3 parts of benzoyl peroxide dissolved in 60 parts of toluene were added to a reaction kettle which contained 48 parts of butanol and 192 parts of xylene within a period of 2 hours at 120° C.

The reaction kettle was maintained at 120° C. for another 2 hours to complete the polymerization. Then 40 parts of copper hydrate, 117 parts of linseed fatty acid and 34 parts of a methoxy functional silicone oligomer (manufactured by the Wacker company and sold under the brand name of Silicone Intermediate SY231) were added to the reactor and refluxed to chase out the low boiling point components until a theoretical amount thereof was obtained. A clear solution was obtained.

EXAMPLE 2

51 parts of a methoxy functional silicone oligomer (manufactured by the Wacker company and sold under the brand name of Silicone Intermediate 231), 52 parts of copper hydrate, 156 parts of linseed fatty acid, 30 parts of hydroxyethylmethacrylate, 40 parts of acrylic acid and 200 parts of xylene and N-butanol were placed in a reactor. The mixture was refluxed to chase out low boiling point components until a theoretical amount thereof was obtained. The obtained solution and a solution containing 1.5 parts of benzoyl peroxide dissolved in 20 parts of toluene and a solution containing 30 parts of butylacrylate and 30 parts of 2-ethylhexylacrylate were added into a reaction kettle within 1 hour at 120° C. Furthermore, a solution containing 35 parts of butylacrylate and 35 parts of 2-ethylhexylacrylate and a solution containing 2.5 parts of benzoyl peroxide dissolved in 30 parts of toluene were added into the reaction kettle with a period of 2 hours at the same temperature. The reaction kettle was maintained at 120° C. for another 2 hours to complete the polymerization.

EXAMPLE 3

A solution containing 20 parts of hydroxyethylmethacrylate, 70 parts of butylacrylate, 10 parts of acrylamide, 30 parts of acrylic acid and 70 parts of methyl methacrylate and a solution containing 3 parts of benzoyl peroxide dissolved in 60 parts of toluene were added to a reaction kettle which contained 48 parts of butanol and 192 parts of xylene within a period of 2 hours at 120° C.

The reaction kettle was maintained at 120° C. for another 2 hours to complete the polymerization. Then 40 parts of copper hydrate, 117 parts of linseed fatty acid and 34 parts of a methoxy functional silicone oligomer (manufactured by the Wacker company and sold under the brand name of Silicone Intermediate 231) were added to the reactor and refluxed to chase out the low boiling point components until a theoretical amount thereof was obtained. A clear solution was obtained.

EXAMPLE 4

51 parts of a methoxy functional silicone oligomer (manufactured by the Wacker company and sold under the brand name of Silicone Intermediate 231), 52 parts of copper hydrate, 156 parts of linseed fatty acid, 30 parts of hydroxyethylmethacrylate, 40 parts of acrylic acid and 200 parts of xylene and N-butanol were placed in a reactor. The mixture was refluxed to chase out the low boiling point components until a theoretical amount thereof was obtained. The obtained solution and a solution containing 1.5 parts of benzoyl peroxide dissolved in 20 parts of toluene and a solution containing 30 parts of butylacrylate and 30 parts of 2-ethylhexylacrylate were added into a reaction kettle within 1 hour at 120° C. Furthermore, a solution containing 30 parts of butylacrylate, 30 parts of 2-ethylhexylacrylate and 10 parts of acrylamide and a solution containing 2.5 parts of benzoyl peroxide dissolved in 30 parts of toluene were added into the reaction kettle with a period of 2 hours at the same temperature. The reaction kettle was maintained at 120° C. for another 2 hours to complete the polymerization.

COMPARATIVE EXAMPLE 1

A solution containing 30 parts of acrylic acid, 90 parts of butylacrylate and 80 parts of methyl methacrylate and a solution containing 3 parts of benzoyl peroxide dissolved in 60 parts of toluene were added to a reaction kettle which contained 48 parts of N-butanol and 192 parts of xylene within a period of 2 hours at 120° C.

The reaction kettle was maintained at 120° C. for another 2 hours to complete the polymerization. Then 40 parts of copper hydrate and 117 parts of linseed fatty acid were added to the reactor and refluxed to chase out the low boiling point components until a theoretical amount thereof was obtained. A clear solution was obtained.

EXAMPLES 5–8

Antifouling paints were prepared from the resins of Examples 1–4 using the following formulations:

| Component | Amount |
|---|---|
| Resin | 25 |
| Cu$_2$O | 40 |
| Bentone #34 | 1.5 |
| Talc | 10 |
| CaCO$_3$ | 5 |
| Xylene | 10 |

The physical properties and antifouling properties of the antifouling paints are summarized in Table I. Control 1 was prepared from a chloro-rubber resin and Control 2 was prepared from a self-polishing organotin resin. Control 3 was prepared from the resin of Comparative Example 1. From a comparison of Examples 5–8 with Control 3, it can be seen that the coating composition containing a silicone resin improves the impact resistance and the antifouling effect of the coating as compared to the coating which contains no silicone resin.

TABLE I

|  | Example | | | | Control 1 | Control 2 | Control 3 |
|---|---|---|---|---|---|---|---|
|  | 5 | 6 | 7 | 8 | | | |
| Hardness | H | HB | H | H | H | H | H |
| Viscosity (ku) | 87 | 76 | 90 | 90 | 85 | 93 | 95 |
| Impact Resistance[a] (500 g × 50 cm) | G | G | G | G | G | G | F |
| Antifouling[b] (%) | | | | | | | |
| After one month | 0 | 0 | 0 | 0 | 0 | 0 | 0 |
| After three months | 20 | 15 | 10 | 10 | 30 | 2 | 25 |
| After six months | 40 | 35 | 30 | 30 | 70 | 20 | 55 |
| After nine months | 70 | 65 | 60 | 60 | 100 | 60 | 80 |

[a]: G: good  F: fair
[b]: Antifouling tests were performed by dipping the testing plates into the sea, and the antifouling ability is expressed by the percentage of fouling area.

What I claim is:

1. A hydrolyzable antifouling coating composition used in forming by crosslinking and polymerization, on the surface of a ship, an antifouling coating which is to be submerged in and gradually hydrolyzed in marine water to consecutively produce a smooth and fresh surface, said coating composition containing:

(a) a copolymer formed of a film-forming binder composition which comprises:
      (i) one or more copolymerizable ethylenically unsaturated monomers or oligomers wherein at least one of said monomers or oligomers has a hydroxy group;
      (ii) a copolymerizable silicone monomer or oligomer; and
      (iii) a film formable metal soap compound which is prepared by reacting a metal compound containing a metal having a valency of at least 2 with a unsaturated fatty acid or alcohol;
   wherein said copolymer has a group having a general formula

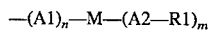
   $$-(A1)_n-M-(A2-R1)_m$$

wherein R1 is a alkenyl group derived from an unsaturated fatty acid or alcohol, M is a metal having a valency of at least 2, A1 and A2 are independently a functional group of a carboxylic acid, a sulfonic acid or a phosphoric acid, and each of n and m=1 or 2, and n+m=2 or 3; and (b) an effective amount of an antifouling agent which is a metallic compound other than said film-formable metal soap compound to prevent fouling of a coated surface of the ship submerged in marine water;
   wherein the film forms upon polymerization of said copolymer moieties and crosslinking of the unsaturated fatty acid groups.

2. A hydrolyzable antifouling coating composition as claimed in claim 1, wherein said copolymerizable silicone monomer has one or more hydroxy or alkoxy groups attached to a silicon atom.

3. A hydrolyzable antifouling coating composition as claimed in claim 1, wherein said unsaturated fatty acid is selected from the group consisting of oleic acid, linoleic acid, linolenic acid, oleostearic acid, lincanic acid, ricinoleic acid, erucic acid.

4. A hydrolyzable antifouling coating composition as claimed in claim 1, wherein said unsaturated fatty acid is obtained from the group consisting of castor oil, soybean oil, corn oil, cotton seed oil, linseed oil, oiticica oil, perilla oil, poppyseed oil, rapeseed soil, safflower oil, sunflower oil, tall oil, tung oil, walnut oil, herring oil, menhaden oil and sardine oil.

5. A hydrolyzable antifouling coating composition as claimed in claim 1, wherein said metal is selected from the group consisting of the metals belonging to group Ib, IIa, IIb, IIIa, IIIb, IVa, IVb, Va, Vb, VIIa and VIII.

6. A hydrolyzable antifouling coating composition as claimed in claim 1, wherein said ethylenically unsaturated monomers comprise unsaturated organic acid monomers selected from the group consisting of carboxylic acids, sulfonic acids, and phosphoric acids.

7. A hydrolyzable antifouling coating composition as claimed in claim 6, wherein said carboxylic acids are acrylic acids.

8. A hydrolyzable antifouling coating composition as claimed in claim 6, wherein said ethylenically unsaturated monomers further comprise monomers selected from the group consisting of acid anhydrides and vinyl monomers containing an amide group.

9. A method of protecting the body of a ship, comprising: applying a hydrolyzable antifouling coating composition on the surface of said ship body to form a protective film which can be gradually hydrolyzed in marine water to consecutively produce a smooth and fresh surface, said coating composition containing a copolymer formed of a binder composition which comprises:

one or more copolymerizable ethylenically unsaturated monomers or oligomers wherein at least one of said monomers or oligomers has a hydroxy group;

a copolymerizable silicone monomer or oligomer; and a film formable metal soap compound which is prepared by reacting a metal compound containing a metal having a valency of at least 2 with an unsaturated fatty acid or alcohol;

wherein said copolymer has a group having a general formula

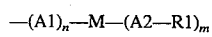
   $$-(A1)_n-M-(A2-R1)_m$$

wherein R1 is a alkenyl group derived from an unsaturated fatty acid or alcohol, M is a metal having a valency of at least 2, A1 and A2 are independently a functional group of a carboxylic acid, a sulfonic acid or a phosphoric acid, and each of n and m=1 or 2, and n+m=2 or 3.

10. A hydrolyzable antifouling coating composition as claimed in claim 7, wherein said ethylenically unsaturated monomers further comprise monomers selected from the group consisting of acid anhydrides and vinyl monomers containing an amide group.

* * * * *